July 15, 1941.  J. H. O'BRIEN  2,249,491
AWNING
Filed Oct. 2, 1939
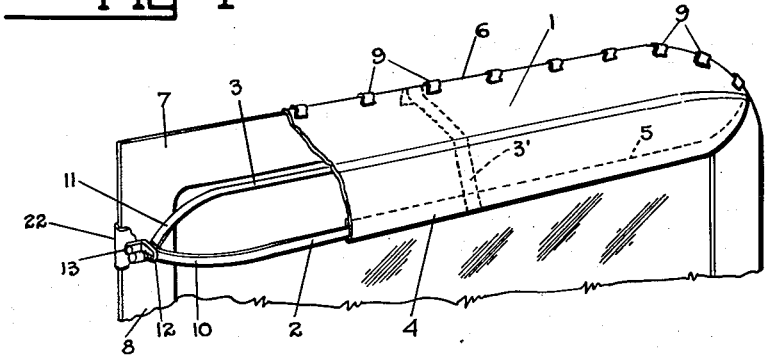
Fig. 1
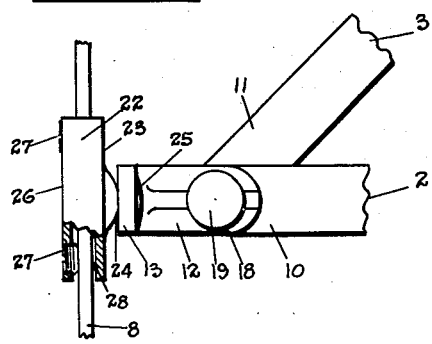
Fig. 2
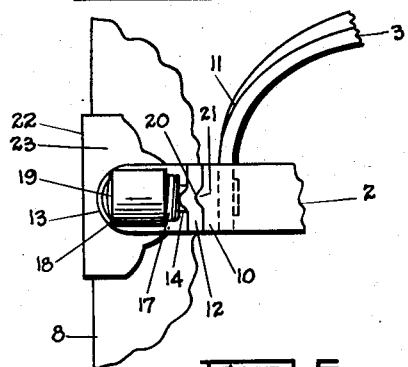
Fig. 3
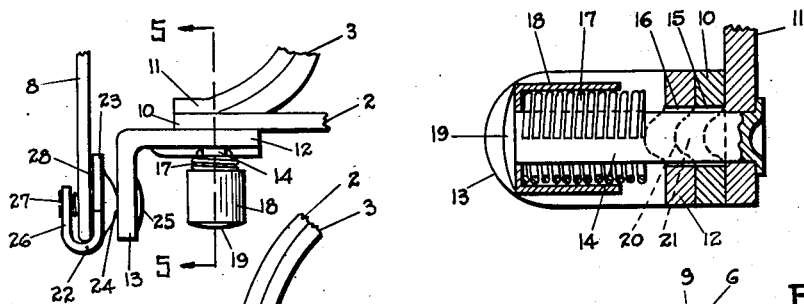
Fig. 4   Fig. 5
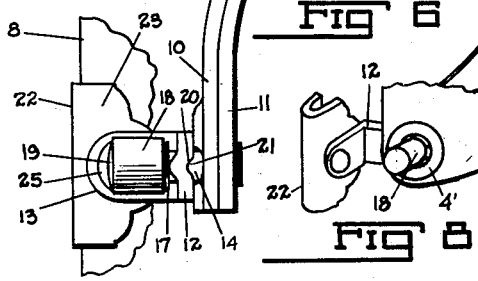
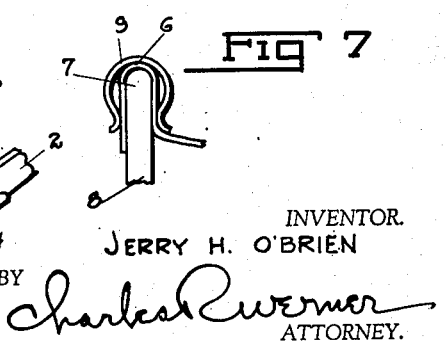
Fig. 6   Fig. 7
Fig. 8
INVENTOR.
JERRY H. O'BRIEN
BY
Charles R. Werner
ATTORNEY.

Patented July 15, 1941

2,249,491

UNITED STATES PATENT OFFICE 2,249,491

AWNING

Jerry H. O'Brien, Wichita, Kans.

Application October 2, 1939, Serial No. 297,464

4 Claims. (Cl. 156—15)

This invention relates in general to awnings and in particular to collapsible awnings for the door windows of vehicle bodies.

The objects of the invention are, first; to provide a collapsible awning which may be opened to provide a sun shade or rain protector, or may be closed flat against the car door when not in use.

Second; to provide novel hinge or pivot members on the awning frame which will afford a positive means for retaining the awning in fully opened position and a spring-urged friction means for retaining the awning in any desired semi-opened position or in closed position.

Third; to provide an improved positive clamp for securing the awning frame to the car door, making the awning virtually theftproof.

Fourth; to provide an improved method of securing the lower edge of the awning and particularly the ends thereof to the frame.

Fifth; to provide a simple method of securing the upper edge of the awning to the car door.

It is essential, in actual practice, that the awning structure be securely fastened to the car door so as to prevent any movement or displacement thereof due to movement of the vehicle or from any accidental jar or vibration, and yet, the fastening means must not mar the vehicle door or necessitate any defacing of the car for installation purposes. The fastening means must also be adaptable for rapid and easy installation or removal. It is also essential that the awning be theftproof since any automobile accessory which is installed on the outside of the car and whose mounting means are accessible from the exterior of the vehicle, can easily be removed by unauthorized persons.

It is also a desired feature in a car door awning to provide a structure which will be free from flapping and vibration when the vehicle is in motion at any speed.

And it is another feature of my invention that the frame structure is reduced to a minimum by directly fastening the top of the awning material to the top of the car door by means of removable spring clips which are positive in action and nondestructive to the car door finish. The ends of the awning material are securely held in place to prevent shrinkage and distortion of the awning.

Another desirable feature is the retaining means which holds the awning in any desired position. The novel design of said means permits instantaneous adjustment of the awning, eliminating any necessity for the loosening or tightening of any lock nuts or lock devices.

Other objects and features of my invention as well as its construction and operation will be readily apparent by reference to the following description in connection with the accompanying drawing in which:

Fig. 1 is a perspective view of an awning comprising my invention, the awning being shown in position on the upper portion of a vehicle door, a portion of the awning cover being broken away to better illustrate the frame.

Fig. 2 is a full size, side elevational view of the awning clamp and frame pivot member, the frame members being shown in fully open position and broken away.

Fig. 3 is a full size, front elevational view of the same.

Fig. 4 is a full size, top plan view of the same.

Fig. 5 is an enlarged cross sectional view on the line 5—5 of Fig. 4.

Fig. 6 is a full size, front elevational view similar to Fig. 3 with the parts shown in closed position.

Fig. 7 is a cross sectional view showing the attachment clamp for the awning, in its clamping position at the top of the vehicle door.

Fig. 8 is a fragmentary perspective view of one end of the awning showing the method of securing the ends of the awning material.

Referring now to the drawing by numerals of reference, I designates the awning covering material placed on a frame which may comprise a lower member 2 and one or more intermediate members 3. As shown in Fig. 1 the awning material is secured at its lower edge 4 about the frame 2 by suitable stitching 5, while the intermediate member 3 is not secured to the awning covering material but is freely movable with respect thereto, although adapted to hold it taut when fully opened. A positioning strip of fabric 3' may be provided at the center of the awning and may be adjustably secured to the intermediate member 3 whereby said member will always assume its proper position when the awning is opened.

The top edge 6 of the covering material may be secured to the top 7 of the vehicle door 8 by lapping a portion of the material over the edge of the door and applying a number of resilient U-clamps 9 which will firmly hold the material in place without marring the door or its finish. (See Figs. 1 and 7.)

The frame members 2 and 3 terminate in curved ends 10 and 11 which are pivotally mounted on a hinge or pivot member comprising an L-shaped bracket 12 with a leg 13. A pin 14 is secured to the end 11 of member 3 and passes through opening 15 in end 10 of member 2 and through opening 16 in L-bracket 12. A spring 17 encircles the pin 14 and is covered by ferrule 18 which is retained in position by head 19 of the pin 14. The spring 17 urges the ends 10 and 11 of the frame members into engagement with each other and with the bracket 12.

For retaining the awning in fully open position I have provided a groove 20 in bracket 12, and a rib 21 on the end 10 of frame member 2, said rib being adapted to engage the groove 20 when the awning is fully opened, the spring 17 providing sufficient tension to retain the rib in the slot under normal conditions.

When the lower frame member 2 is raised the rib 21 will ride out of the groove 20 and will frictionally engage one side of the L-bracket 12 and increase the tension on the spring 17, thereby causing the frame member 2 to remain in any position in which it is set. (See Fig. 6.)

The ends of the awning material may be provided with grommets 4' which slip over the ferrules 18, and thereby hold the ends of the awning secure to prevent shrinkage or distortion of the awning.

For securing the bracket 12 to the car door I have provided a clamp 22 of substantially U-cross section. One side 23 of the U-clamp is firmly secured to the leg 13 of the bracket 12 as shown at 24, by means of a rivet 25 or other suitable means.

The other side 26 of the U-clamp is provided with several set screws 27 which may be turned up to securely hold the bracket to the car door. A protecting piece of fabric 28 may be provided betwen the U-clamp and the outer surface of the car door.

With my U-clamp and method of installation it is impossible to remove the awnings when the car doors are locked since the set screws 27 cannot be manipulated except when the doors are open. This construction renders my device substantially theftproof, a very desirable feature.

From the foregoing it will be apparent that I have provided a car door awning which is relatively inexpensive to manufacture, is simple to install and operate, and does not injure or mark the vehicle due to its installation but can be installed, used and removed without leaving any outward mark or blemish. The manner in which it is installed renders it virtually theftproof, it being impossible to remove the awning as a unit without first opening the door.

Its use when driving through a snow, sleet or rainstorm will keep the snow, sleet or rain from collecting on the side windows and therefore will enhance the visibility through said windows.

Obviously, changes in form, proportion and details of construction may be resorted to without departing from the spirit of my invention and I reserve all rights to such changes as fall within the scope of these specifications and the following claims.

What I claim as new and desire to secure by Letters Patent is:

1. In a collapsible awning for vehicle doors, a frame structure, brackets for pivotally securing the frame structure to the door, a fabric covering on the frame, the lower edge of the covering being secured to the frame, the upper edge of the covering being secured to the upper edge of the door, and the ends of the covering being secured at the brackets.

2. In a collapsible awning for vehicle doors, a frame structure, brackets for pivotally securing the frame structure to the door, a fabric covering on the frame, the lower edge of the covering being secured to the frame, the upper edge of the covering being secured to the upper edge of the door, an eyelet at each end of the covering, and a pin on each bracket for receiving one of said eyelets.

3. In a collapsible awning for vehicle doors, brackets for supporting the awning on the door, a frame structure including a plurality of elongated members, the ends of said members terminating at the brackets, pins secured to each end of one of the elongated members, said pins passing through the other frame members and through the brackets, a spring surrounding each pin and adapted to abut the bracket, and a spring retainer on each pin.

4. In a collapsible awning for vehicle doors, brackets for supporting the awning on the door, a frame structure including a plurality of elongated members, the ends of said members terminating at the brackets, pins secured to each end of one of the elongated members, said pins passing through the other frame members and through the brackets, a spring surrounding each pin and adapted to abut the bracket, a spring retainer on each pin, a groove in the bracket, a rib on the end of the member adjacent the bracket and adapted to engage the groove when the frame member is in fully opened position.

JERRY H. O'BRIEN.